United States Patent [19]
Antonov

[11] Patent Number: 5,309,778
[45] Date of Patent: May 10, 1994

[54] GEAR BOX WITH CONTINUOUSLY VARIABLE GEAR

[75] Inventor: Roumen Antonov, Paris, France

[73] Assignee: Antonov Automotive North America B.V., Rotterdam, Netherlands

[21] Appl. No.: 603,739

[22] PCT Filed: May 12, 1989

[86] PCT No.: PCT/FR89/00231
§ 371 Date: Jan. 4, 1991
§ 102(e) Date: Jan. 4, 1991

[87] PCT Pub. No.: WO89/11405
PCT Pub. Date: Nov. 30, 1989

[30] Foreign Application Priority Data

May 16, 1988 [FR] France ................. 88 06515
Dec. 21, 1988 [FR] France ................. 88 16988

[51] Int. Cl.$^5$ ............................................. F16H 1/38
[52] U.S. Cl. .................................... 74/15.86; 475/151
[58] Field of Search ............... 475/151, 152, 184, 185, 475/214, 215; 74/15.63, 15.66, 15.84, 15.86, 15.88

[56] References Cited

U.S. PATENT DOCUMENTS

| | | | |
|---|---|---|---|
| 3,739,647 | 6/1973 | Crooks | 74/15.63 |
| 3,774,460 | 11/1973 | Browning et al. | 74/15.84 |
| 4,136,751 | 1/1979 | Poore et al. | 74/15.86 |
| 4,216,684 | 8/1980 | Hagin et al. | 74/15.86 X |
| 4,233,858 | 11/1980 | Rowlett | 475/152 X |

FOREIGN PATENT DOCUMENTS

| | | |
|---|---|---|
| 2350337 | 4/1975 | Fed. Rep. of Germany . |
| 7711621 | 8/1977 | Fed. Rep. of Germany . |
| 2742305 | 5/1978 | Fed. Rep. of Germany . |
| 3011833 | 10/1981 | Fed. Rep. of Germany . |
| 692079 | 10/1930 | France . |
| 1234615 | 10/1960 | France . |
| 2067421 | 8/1971 | France . |
| 57-107462 | 7/1982 | Japan ............................. 475/152 |
| 2107806 | 5/1983 | United Kingdom ............ 74/15.63 |

Primary Examiner—Dirk Wright
Attorney, Agent, or Firm—Kenyon & Kenyon

[57] ABSTRACT

A differential pinion shaft is coupled to the input shaft. A crown is coupled to the output shaft. The mechanical resistance of a compensated sub-assembly, multiplied by a gear, is transmitted to a planet wheel. The speed of rotation of the planet stabilizes and, as a result, the transmission ratio between the input shaft and the output shaft stabilizes when the two forces acting on the periphery of the pinion are equal, although they then correspond to a torque much larger on the output shaft than on the planet wheel, the couple on the planet wheel being greater than that on the shaft of the compensator sub-assembly. The sub-assembly comprises an inertial load and a consuming load the joint behavior of which, depending on the speed of rotation and on the acceleration, resembles, on a smaller scale, that of the vehicle.

3 Claims, 4 Drawing Sheets

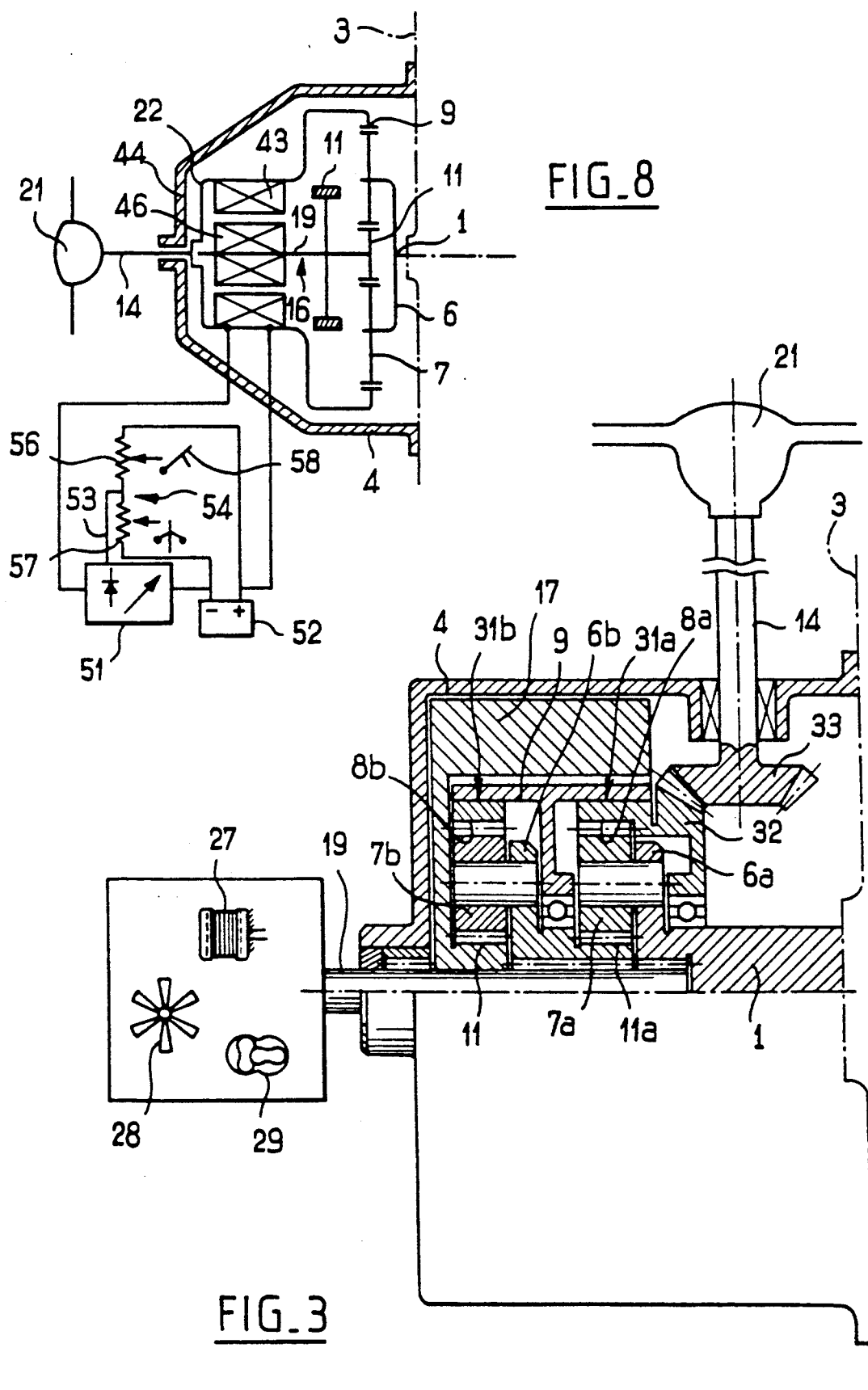

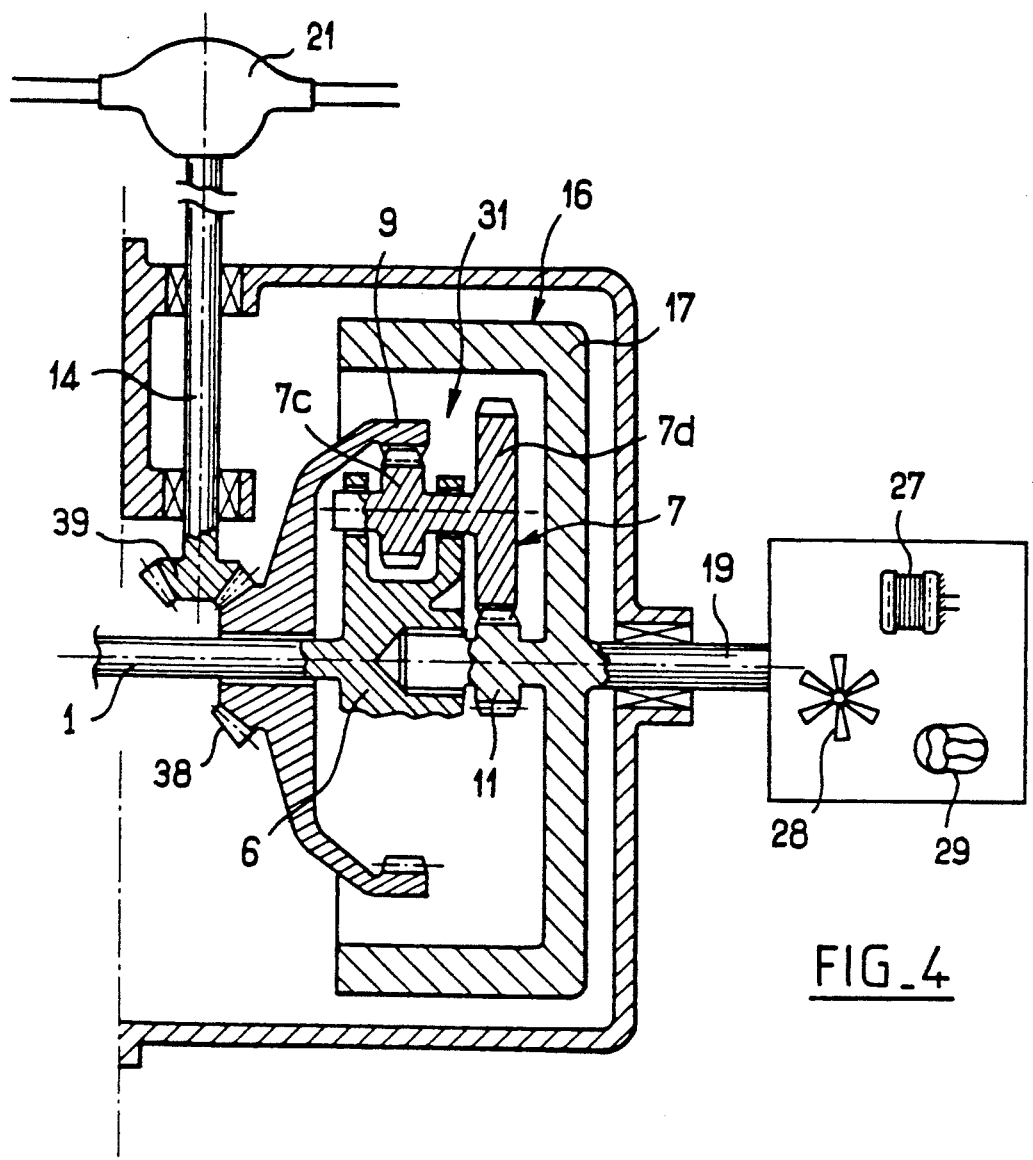
FIG_4
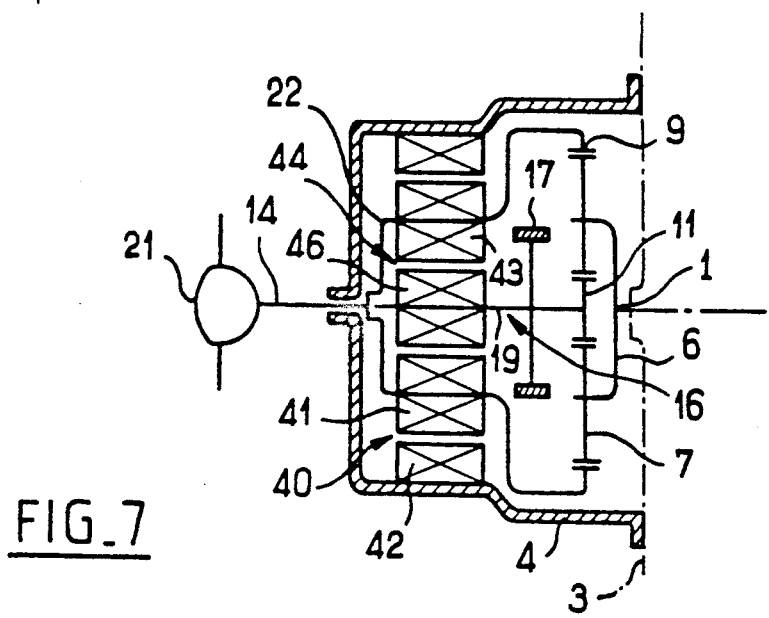
FIG_7

GEAR BOX WITH CONTINUOUSLY VARIABLE GEAR

BACKGROUND OF THE INVENTION

1. Technical Field

The present invention relates to a continuously variable gear transmission adapted for land vehicles such as automobiles, motorcycles, and the like.

2. Background Art

There are known, from German laid-open patent application DE-A-30 11 833 and French Patent No. FR-A-692,079, automatic transmissions for vehicles, comprising a planetary gear train interconnecting an input shaft and an output shaft, this gear train comprising at least one gear which is arranged to distribute power, delivered to the input shaft, between the output shaft of the transmission and a balancing subassembly turning at a speed generally different from that of the output shaft.

The balancing subassembly comprises a flywheel of constant or variable inertia. According to these references, the inertia of the flywheel will impose on the planet gears a reaction force which will balance the resistance of the vehicle against movement. In other words, each planet gear will be subjected about its axis to two torques which balance each other, one originating from the inertia of the flywheel, and the other originating from the resistance of the vehicle against movement.

An inertia type of device, such as a flywheel, can generate a reaction force in the desired direction only in response to an accelerating force, assuming negligible mechanical friction and windage losses. However, it is impractical to increase the speed of rotation of the flywheel in order to maintain vehicle movement, because this speed will become prohibitive. Moreover, the engine speeds needed to produce increasingly higher flywheel speeds will also become excessive.

This difficulty was apparently recognized in FR-A-692 079, which proposes, in addition, a centrifugal friction device which, above a certain speed of rotation of the output shaft, ensures a connection (direct coupling) between the inertial flywheel and the output shaft. This direct coupling device does not permit automatic adaptation of the transmission ratio between the input and the output shaft above a given vehicle speed. Moreover, if it is necessary to effect coupling while the flywheel has acquired a substantial speed of rotation, a friction lining provided to ensure coupling with the flywheel will be subjected to considerable wear and heating. There is also the problem of travel at a vehicle speed slightly below the condition causing direct coupling. It would apparently be difficult in this case to operate without slippage between the friction lining and the flywheel.

German laid-open patent application DE-A-27 42 305 (corresponding to U.S. Pat. No. 4,136,751 of POORE et al.) discloses a planetary gear transmission for a construction machinery vehicle which distributes the power produced by a free turbine type gas turbine between a first power path connected directly to the drive wheels of the vehicle and a second power path connected to a hydraulic pump for driving power-consuming auxiliary equipment.

A power transfer assembly selectively couples the drive shaft of the hydraulic pump to the first power path so that the rotational speed of the pump cannot exceed a preselected value. The power transfer assembly includes a friction clutch and a clutch control system that is responsive to the rotational speed of the hydraulic pump shaft to modulatingly regulate the clutch engagement for transferring power from the second power path to the first power path. This transmission system does not include, however, an inertia device, such as a flywheel, in the second power path.

SUMMARY OF THE INVENTION

The object of the present invention is to provide a gear transmission which simply and effectively adjusts the transmission ratio between an input shaft and an output shaft while providing in the transmission a mechanism of the differential type having a third shaft that is connected to a balancing subassembly.

According to the invention, in a vehicle having an engine and drive wheels, a transmission with automatic variation of the transmission ratio includes a gear train interconnecting an input shaft, an output shaft, and a balancing subassembly, this gear train comprising at least one gear which is arranged to distribute power, delivered from the engine to the input shaft, between the output shaft and the balancing subassembly, which rotates at a speed generally different from that of the output shaft, means other than the at least one gear being provided to withdraw useful energy from the balancing subassembly. The transmission is characterized in that the speed and acceleration of the load constituted by the balancing subassembly is related to the speed and acceleration of the load driven by the output shaft.

The term useful energy means energy which is used in the operation of the vehicle, for example for the operation of certain accessories of the engine or of the vehicle, or even to be returned to the drive wheels downstream of the transmission.

The invention teaches placing in equilibrium with each other not two output shafts driving variable loads but the single output shaft with a balancing subassembly having a resistance to rotation, as a function of speed and of acceleration, that is selected to optimize the transmission ratio between the input and the output.

There is thus provided a transmission able to establish spontaneously between the input and the output a transmission ratio which is appropriate for the power developed by the engine (which is determined by the driver by action on the accelerator pedal) and of the resistant load encountered by the output shaft and above all by the nature of this load (that is to say the distribution between the inertia fraction and the fraction which is a function of speed).

According to a preferred embodiment of the invention, the means to withdraw energy from the balancing subassembly comprises an energy-consuming load, particularly an auxiliary mechanism such as a supercharging compressor, fan, cooling water pump, electric generator, etc.

Such auxiliary mechanisms usually impose a resistance which is proportional to the square of their speed of rotation. The same is true of the resistance to movement of a vehicle through the air. With an appropriate choice of parameters of the transmission and the auxiliary mechanism, it is thus possible to provide that for any speed of the vehicle, the transmission will operate at a steady state in which the energy consuming load has an acceptable constant speed of rotation.

Preferably, the balancing subassembly comprises or drives an inertial load. The load constituted by the vehicle having itself an inertial component, the two inertial components balance each other in the transmission during acceleration of the vehicle.

Thus, for all conditions of operation of the vehicle (combination of a value of speed and a value of acceleration), there is an equilibrium between the resistance offered by the vehicle and the resistance offered by the balancing subassembly, and the transmission itself finds an operation condition in which the balancing subassembly is never driven at an excessive speed of rotation.

Other characteristics and advantages of the invention will appear from the following description.

BRIEF DESCRIPTION OF THE DRAWINGS

In the accompanying drawings, given by way of non-limiting example:

FIG. 3 view of a third embodiment of the transmission according to the invention, half of the view being in axial section;

FIG. 4 is an axial cross section, with parts broken away, of a fourth embodiment of the transmission according to the invention;

FIGS. 7 and 8 are schematic views of sixth and seventh embodiments, respectively, of the transmission according to the invention.

DESCRIPTION OF THE PREFERRED EMBODIMENTS

Figure 1:
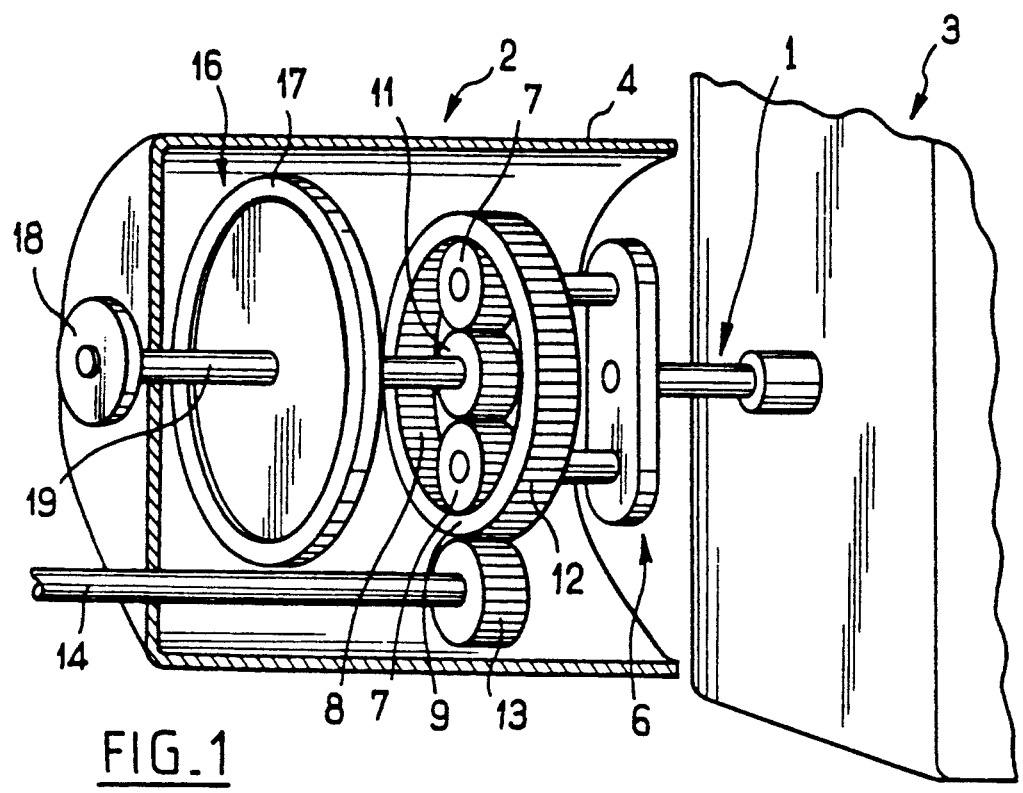
FIG. 1 is a perspective schematic view of a transmission according to the invention, the transmission housing being shown in vertical section along an axial plane.

In the embodiment shown in FIG. 1, an input shaft 1 of the transmission 2 comprises also the output shaft 1 of an engine shown schematically at 3, which for example is an internal combustion engine.

The transmission 2 comprises a housing 4 which is secured to the block of the engine 3.

The input shaft 1 rotatably drives a coaxial planet carrier 6 on which planet gears 7, two in number and diametrically opposed in the example, are mounted for free rotation.

Each planet gear 7 meshes with internal teeth 8 of a ring gear 9 and with external teeth of a sun gear 11.

The sun gear 11, the two planet gears 7, the planet carrier 6, and the ring gear 9 thus constitute a planetary gear train.

The ring gear 9 also has external teeth 12 meshing with a pinion 13 connected to an output shaft 14 of the transmission 2. The sun gear 11 is rotatably coupled to a balancing subassembly 16 comprising a flywheel 17 and a pulley 18 mounted on a shaft 19 for driving an auxiliary energy-consuming mechanism (not shown) such as an electrical generator, a cooling fan for the engine, or a supercharging compressor for the engine.

Thus, each planet gear 7 is arranged to distribute power, delivered from the engine, between the output shaft 14 of the transmission and the balancing subassembly 16.

In other words, each planet gear 7 is subjected at its periphery to two forces of opposite direction about the axis of the planet gear; a force resisting rotation of the balancing mechanism 16 and a force resisting rotation of the output shaft 14. The speed of rotation of the planet gear 7 about its own axis will be constant when these forces are equal.

Under all conditions of operation of the vehicle (combination of speed and acceleration at each moment) the vehicle imposes a certain resistance to movement (generally proportional to the square of its speed), and an inertial force when the acceleration in positive. The balancing subassembly 16 itself imposes a resistance which can be proportional to the square of its speed of rotation, due to the auxiliary mechanism driven by the pulley 18, and a resistance to acceleration due to the flywheel 17. Thus, at each moment, the transmission tends to establish between the input shaft 1 and the output shaft 14 a transmission ratio that will equalize the two forces exerted on the periphery of each planet gear.

It is important to note that when these two forces are equal, the torques transmitted by the sun gear 11 and the ring gear 9 are very different because the diameter of the sun gear 11 is very much smaller than that of the internal teeth 8 of the ring gear 9. The ratio of these diameters may be for example 1 to 10. Thus, under equilibrium conditions, the power transmitted to the output shaft 14 may be very much higher than the power transmitted to the balancing mechanism 16.

Upon starting the engine and during braking, the speed of rotation of the input shaft 1 is low. The engine torque exerted on the input shaft 1 causes the balancing subassembly 16 to turn via the planet gears 7 which roll about the sun gear 11, which remains motionless due to the resistance to movement of the vehicle, perhaps augmented by the parking brake. The speed of rotation of balancing subassembly 16 will, on the contrary, be relatively high, for example 5,000 rpm, or about ten times greater than that of the input shaft 1 in the foregoing example.

Means can be provided under these circumstances to limit or eliminate the resistance transmitted to the pulley 18, so as to limit or eliminate the force transmitted uselessly to the output shaft 14 as long as the driver of the vehicle does not desire the vehicle to move. It can also be provided that at this speed of rotation of the shaft 19, the resistance to rotation of the auxiliary mechanism will be relatively small.

To start the vehicle in motion, the parking brake is released and the mechanical resistance transmitted to pulley 18 is re-established if this resistance was eliminated during braking. A torque is thereafter transmitted to the output shaft 14. It can be increased as desired by increasing the speed of rotation of the input shaft 1, so as to increase the reaction transmitted to the sun gear 11 by the flywheel 17 and the pulley 18, and to cause the auxiliary mechanism to achieve a higher speed of rotation at which its resistance to rotation will become substantial. The vehicle accelerates without the need to resort to any friction mechanism.

Once the vehicle is in motion, the torque necessary to maintain the movement decreases. As a result, the power of the engine is increasingly transferred by the planetary train to the output shaft of the transmission 2. The speed of rotation of the flywheel 17 decreases, and a portion of its stored kinetic energy is transferred to the output shaft 14. As a result, the transmission automatically and continuously changes the speed ratio between the input shaft 1 and the output shaft 14. There is neither a maximum nor a minimum value of this ratio.

The ratio may vary continuously, as a function simultaneously of the torque and of the power supplied by the engine 3 under control of the driver, and of the resistance to movement of the vehicle. When the resistive torque of the vehicle is high, for example when going uphill or during acceleration, the speed of rotation of the balancing subassembly 16 will increase to balance the resistive torque on the output shaft 14, and as a result the speed of rotation of the shaft 14 will decrease relative to that of the input shaft 1. The same is true when a braking force is applied to the vehicle or even simply when the driver releases the accelerator pedal of the vehicle. The vehicle will slow and stop with the engine running, the subassembly 16 having its relatively high rotation speed described above in connection with operation in the idle condition. This high rotation speed implies that the flywheel 17 has stored the kinetic energy of the vehicle during the deceleration phase, and this energy is available for subsequent restarting or reacceleration.

According to a non-limiting example, a four-cycle engine with a displacement of 1,000 to 1,500 cm$^3$, a power of 70 kw at 6,000 rpm, and a maximum torque of 150 Nm at 3,000 rpm requires a flywheel of about 250 to 300 mm diameter, having a weight of the order of 15 to 18 kg, turning at about 7,000 rpm at most, if the empty weight of the vehicle is about 1,000 kg.

In the case of a motorcycle with an engine of about 1,000 cm$^3$ developing 70 kw at 10,000 rpm with maximum torque of 150 Nm at 4,800 rpm, the flywheel is of about 230 to 250 mm diameter, weighing about 10 kg and can turn about 10,000 rpm at a maximum if the empty weight of the motorcycle is about 250 kg.

In other words, this flywheel is lighter and smaller than a flywheel that ordinarily is coupled to the crank shaft of a heat engine. Moreover, the flywheel of the transmission according to the invention replaces the usual flywheel provided in a heat engine and imparts to the idle state of the heat engine an exceptional stability, due to the very high speed of rotation of the flywheel when the engine idles while the vehicle is stopped.

Given the high speed of rotation of the flywheel when the vehicle is stopped with the engine idling, it is possible to connect a starter directly to the shaft 19 of the subassembly 16. This avoids the problems of temporary coupling between the starter and the inertial flywheel. The arrangements known heretofore for temporarily engaging a starter are particularly subject to wear.

It is possible to connect an electrical generator for the vehicle to the shaft 19, and this generator can function as a motor serving as a starter for the heat engine 3.

There will now be described other embodiments of the invention, using the same reference numerals to designate elements functionally analogous to those of FIG. 1.

In the embodiment shown in FIG. 1, it is for reasons of clarity of exposition that the sun gear 11 has been directly connected to the subassembly 16, and that the ring gear 9 has, on the contrary, been connected to the output shaft 14 by means of pinion 13.

Figure 2:
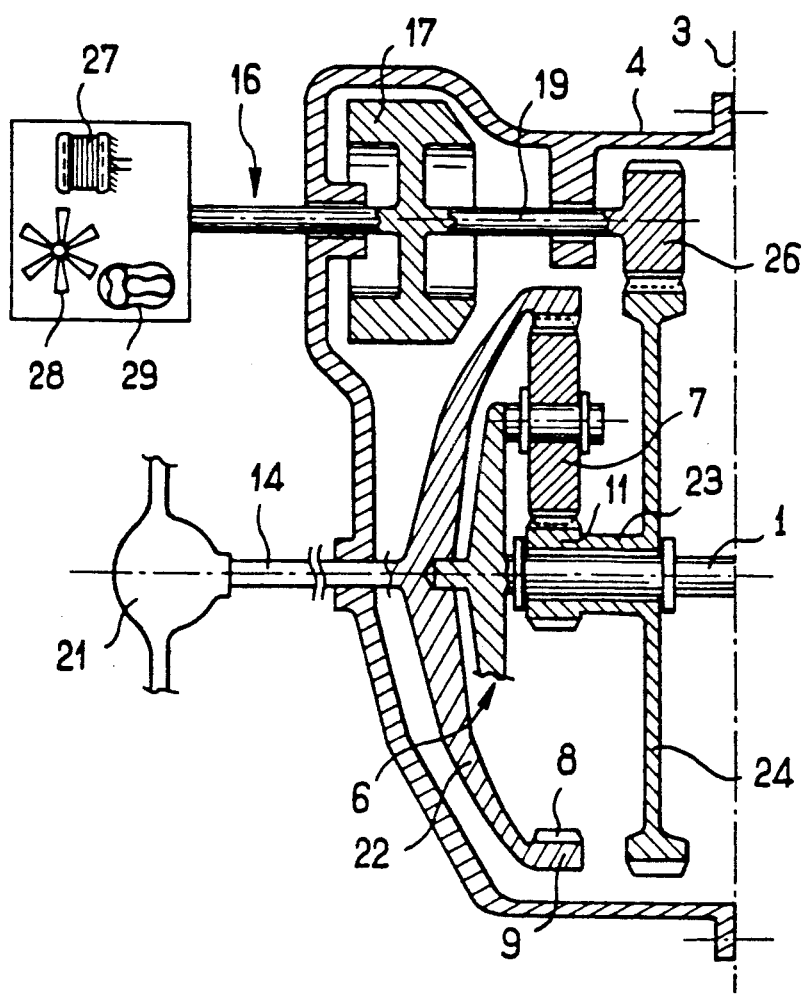
FIG. 2 is an axial cross section, with parts broken away, of a second embodiment of the transmission according to the invention.

However, as shown in FIG. 2, it is preferable to do the reverse, which is to say, to connect the ring gear 9 directly to the output shaft 14, which is accordingly coaxial with the input shaft 1, and which constitutes the input shaft of a conventional differential 21. A bell 22 connects the ring gear 9 rigidly to the shaft 14. The planet carrier 6 is disposed between the bell 22 and the sun gear 11, which is connected by a tube 23 enclosing the input shaft 1 to a gear 24 of relatively great diameter meshing with a pinion 26 of relatively small diameter fixed to the shaft 19 of the balancing subassembly 16.

The flywheel 17 is accordingly eccentric relative to the input shaft 1. There is shown, at the free end of shaft 19, an electric generator 27 which can serve as a starter, a fan 28, and a mechanical supercharging compressor 29, to illustrate that at least one of these three accessories can be coupled to shaft 19 as the energy consuming load that produces a resistance to rotation of the sun gear 11 even when this latter turns with constant speed.

It will be noted that the gear 24 and the pinion 26 constitute a multiplier of speed of rotation of the balancing subassembly 16 relative to that of the sun gear 11. In other words, the resistive torque of the sun gear 11 is a multiple of that of the shaft 19. This step-up gear ratio advantageously increases the peripheral force transmitted by the sun gear 11 to the planet gears 7. It is therefore even easier than in the preceding embodiment to provide that a balancing load of relatively low torque and power consumption will produce at the periphery of the sun gear 11 a reactive force capable of balancing that transmitted by the shaft 14 to the internal teeth 8 of the ring gear 9 of the planetary train.

In the embodiment shown in FIG. 3, the flywheel 17 and the shaft 19 are coaxial with the input shaft 1, as in the embodiment of FIG. 1. However to avoid the use of planet gears having a diameter as large as is necessary in the embodiment of FIG. 1 to effect the ratio of ten between the number of internal teeth 8 of the ring gear 9 and the number of teeth of the sun gear 11, the planetary gear train comprises two individual planetary trains 31a and 31b mounted in series. The planet carrier 6a of the first train 31a is rigidly connected to the input shaft 1. It carries planet gears 7a which mesh on the one hand with first interior teeth 8a of the ring gear 9 and on the other hand with an intermediate sun gear 11a which is fixed for rotation with the planet carrier 6b of the second train 31b. The planet gears 7b carried by the planet carrier 6b mesh with second interior teeth 8b of the ring gear 9, of the same diameter and same number as teeth 8a, and with the sun gear 11 of the second train 31b, which is fixed to shaft 19 of the balancing subassembly. The ring gear 9 is fixed to a bevel gear 32 meshing with a bevel pinion 33 fixed to the output shaft 14, which extends perpendicular to the input shaft 1 and to the shaft 19 of the balancing subassembly. This arrangement can be of interest for vehicles with a transversely mounted engine. The annular mass of the flywheel 17 peripherally encloses the ring gear 9.

The embodiment shown in FIG. 4 corresponds to that of FIG. 3 except that the two individual planetary trains are replaced by a single train 31 having a planet carrier 6 that carries planet gears 7 comprised each by two individual pinions, a first pinion 7c of relatively small diameter meshing with the ring gear 9 and a second pinion 7d of relatively large diameter meshing with the sun gear 11 fixed to the shaft 19 of the flywheel 17. Thus, the reactive force transmitted peripherally to the planet gears 7 by means of sun gear 11 has a lever arm about the axis of each planet gear 7 that is greater than the resistive force transmitted to the planet gears 7 by the ring gear 9. Thus, once again a relatively small torque on the shaft 19 is capable of balancing a relatively great torque on the ring gear 9.

It is of interest to note that the more the resistive torque of shaft 19 is increased relative to that of the ring gear 9, about the axis of each planet gear 7, by means of mechanical transformation such as the speed multiplier 24, 26 of FIG. 2, the double planet train 31a, 31b of FIG. 3, or the planet gears with two individual pinions 7c and 7d of FIG. 4, the more the system is capable of operating with relatively low speeds of shaft 19.

For example, in FIG. 2, the presence of the speed multiplier 24,26 does not result in an increase of the speed of rotation of shaft 19 relative to the case of FIG. 1 for given speeds of the input shaft 1 and the output shaft 14, but on the contrary, results in a diminution of this speed, the speed of rotation of the sun gear 11 being still more diminished relative to the case of FIG. 1.

Figure 5:
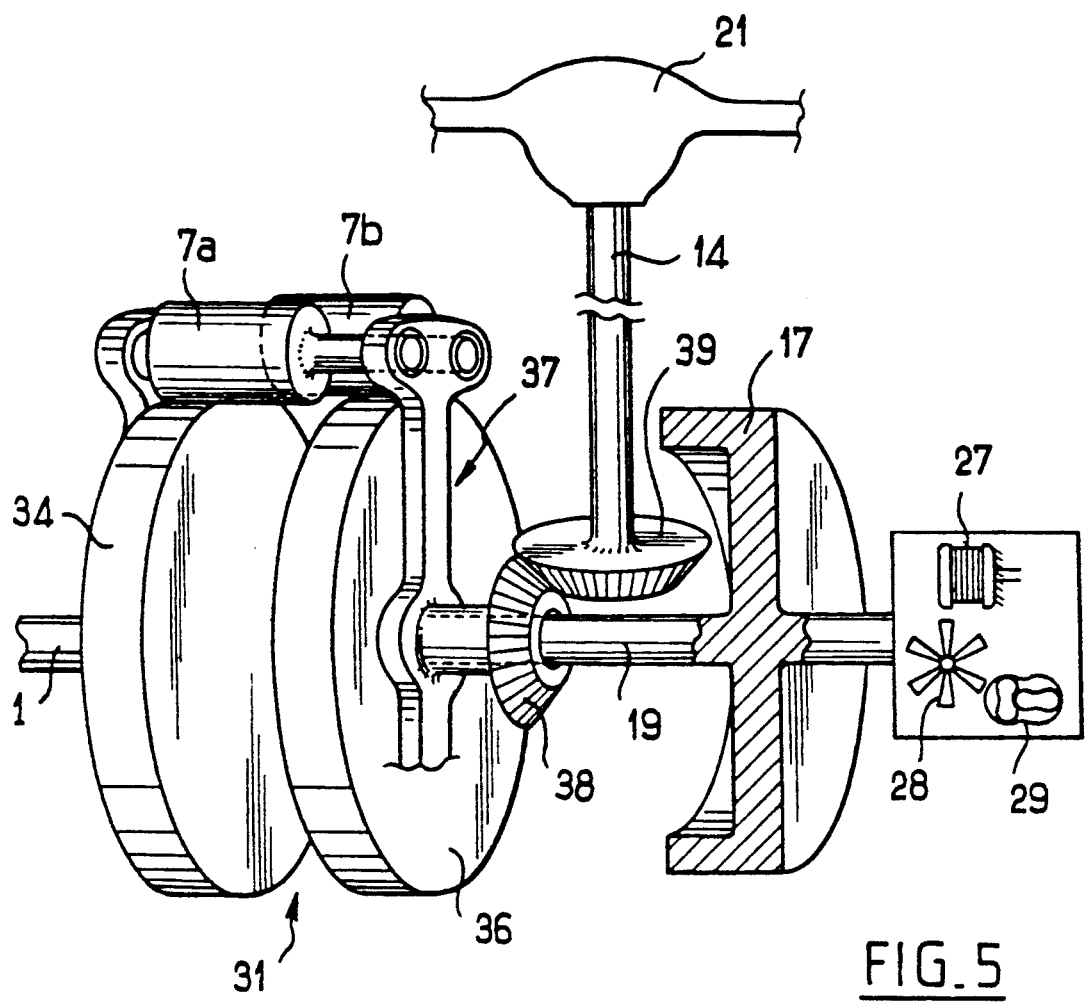
FIG. 5 is a schematic perspective view, partially in section and broken away, of a fifth embodiment of the transmission according to the invention.
Figure 6:
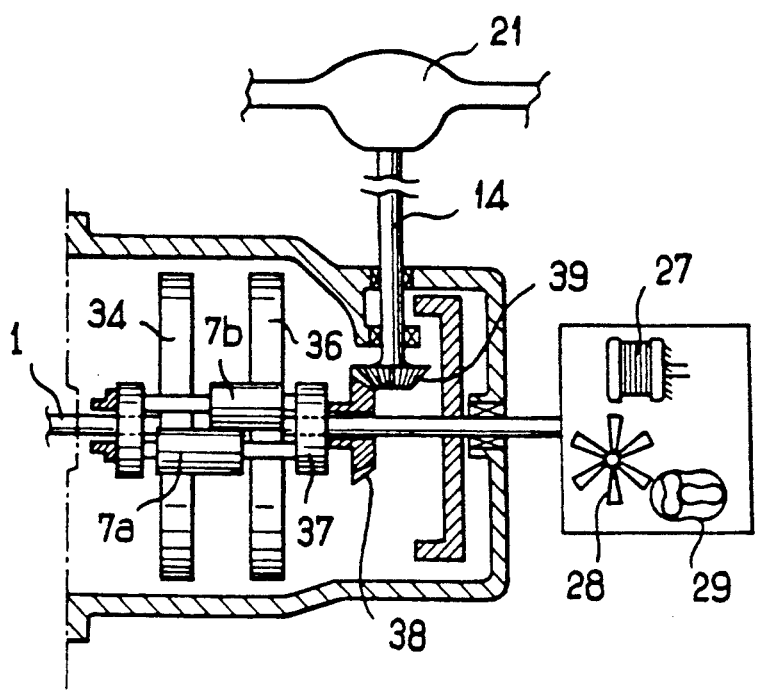
FIG. 6 is an elevational view, partially in axial section, of the embodiment of FIG. 5.

In the embodiment of FIGS. 5 and 6, the gear train 31 is constituted by a mechanism of the so-called "cylindrical differential" type. It comprises an input sun gear 34 connected rigidly to the input shaft 1, and an output sun gear 36 fixed to the shaft 19, which is coaxial with shaft 1. The sun gears 34 and 36 each have external cylindrical teeth. A planet carrier 37 is fixed to a bevel pinion 38 meshing with a bevel gear 39, of greater diameter than pinion 38 and fixed to the output shaft 14 of the transmission. The planet carrier 37 carries at least one pair of planet gears 7a, 7b meshing with each other and each respectively meshing with one of the sun gears 34 and 36. Due to the large diameter ratio of bevel gear 39 to pinion 38 the resistive torque on the output shaft 14 is transmitted at a reduced value to the planet carrier, which permits balancing with the resistive torque of the balancing subassembly.

In the embodiment shown in FIG. 7, which will be described only as to its differences relative to the embodiment of FIG. 1, the ring gear 9 is coupled to the output shaft 14 by means of a bell 22. The external surface of bell 22 carries rotor elements 41 of an electrodynamic apparatus that includes an electric motor 40 having a stator 42, surrounding the rotor 41, that is fixed to the internal surface of the housing 4.

The internal surface of the bell 22 carries a pseudo-stator 43 of a generator 44, which has a rotor 46, surrounded by the pseudo-stator 43, that is fixed to the shaft 19 of the balancing subassembly 16. Member 43 is called a pseudo-stator, and not merely a stator, because the pseudo-stator 43 serves electrically as a stator relative to rotor 46 connected to shaft 19, but it turns with bell 22.

The generator 44 operates as a motor for starting the engine 1, as previously described in connection with the embodiments of FIGS. 1 and 2, and as a generator serving as an energy consuming load associated with the balancing subassembly 16 during vehicle operation, to control the transmission ratio between the input shaft and the output shaft 14 of the transmission.

When the generator 44 operates as an electrical generator, the power which it provides is regulated, for example by controlling its excitation voltage, so as to create on the shaft 19 a resistive torque having the desired value for the conditions of operation of the vehicle. Any surplus current produced by the generator 44 is set to the electric motor 40 where it is transformed into mechanical energy transmitted to the output shaft 14.

The power produced by generator 44 can be adjusted with regard to the various parameters of operation of the vehicle. For example, if the driver requires maximum power from the engine, it is usually desirable that the transmission provide a reduction ratio permitting the engine to operate at a relatively high rotating speed close to the rated maximum power condition. In this case, the generator 44 can be made to operate according to a characteristic corresponding to a relatively low resistive mechanical torque to permit the input shaft 1 to have a speed of rotation greater than that of shaft 14.

In the embodiment shown in FIG. 8, the motor 40 of FIG. 7, which is to say the rotor 41 and the stator 42, has been omitted from the electrodynamic apparatus. A thyristor control device 51 is connected in series with a storage battery 52 of the vehicle between the power terminals of the generator 44. The thyristor control device 51 regulates the electromagnetic force of the generator as a function of the voltage applied to a control input 53. The input voltage is the voltage at the midpoint of a voltage divider 54 comprising two variable resistors 56, 57.

The ohmic value of the resistor 56 is a function of the pressure on an accelerator pedal 58 of the vehicle. Increasing the pressure on the accelerator pedal reduces the electromagnetic torque, so as to increase the input/output ratio of the transmission (i.e., to increase the speed of the input shaft 1 relative to that of the output shaft 14).

The ohmic value of the resistor 57 is a function of the speed of rotation of the output shaft 14. The higher the speed of the output shaft 14, the more the thyristor control device 51 increases the electromagnetic torque of the generator 44 so as to decrease the input/output ratio of the transmission.

The generator 44 is thereby controlled so as to vary the resistive torque that is transmitted to the shaft 19 of the balancing subassembly for a given electric power required by the electric circuit of the vehicle, and this, given the resistive torque exerted by the vehicle on the output shaft 14, determines a certain relative speed between the shafts 19 and 14. The reaction torque which is opposed by the pseudo-stator 43 constitutes an additional motor torque transmitted to the bell 22 and accordingly to the output shaft 14.

In other words, it is known that the mechanical power is equal to the torque multiplied by the speed of rotation. If it is desired that the output shaft 14 turn rapidly relative to the input shaft 1, the generator 44 is controlled so that its electromagnetic torque increases, which increases the resistance to rotation transmitted to the sun gear 11, and as a result increases the speed of the output shaft 14, which is the same as the speed of rotation of the pseudo-stator 43. Under these circumstances, the speed of rotor 46 relative to pseudo-stator 43 has decreased, but the electromagnetic torque has increased, so the electric power furnished by the generator 44 is maintained substantially constant, equal to that required by the circuit.

Thus, the reaction power transmitted to the shaft 19 by the generator 44 is always equal to the electric power consumed by the circuit plus the mechanical power transferred by the pseudo-stator 43 to the bell 22 and thence to the output shaft 14.

As a modification, relative to each of the embodiments described, the flywheel 17 could be omitted if the moment of inertia of the accessories driven by the balancing subassembly is sufficient, given in particular their speed of rotation. There are, for example, centrifugal supercharging compressors turning at very high speeds and which, as a result, even though they are relatively lightweight, are capable of opposing the rotation of shaft 19 with a high inertia.

I claim:

1. In a vehicle having an engine, a supercharging compressor, and at least one drive wheel, an automatically variable ratio transmission that comprises:
    an input shaft connected for receiving power from the engine;
    an output shaft drivingly coupled to the at least one drive wheel;
    a gear train having an input element connected to the input shaft, an output element coupled to the output shaft, a third element, and at least one gear arranged to distribute power, supplied from the engine, between the output element and the third element; and
    means for coupling the third element to the supercharging compressor.

2. An automatically variable ratio transmission according to claim 1 wherein the means for coupling the third element of the gear train to the supercharging compressor comprises means for multiplying the rotating speed of the supercharging compressor with respect to the speed of the third element.

3. In a vehicle having an engine and at least one drive wheel, an automatically variable ratio transmission comprising:
    an input shaft connected for receiving power from the engine;
    an output shaft drivingly coupled to the at least one drive wheel;
    a balancing subassembly;
    a gear train having an input element connected to the input shaft, an output element coupled to the output shaft, a balancing element, and at least one gear arranged to distribute power supplied from the engine between the output element and the balancing element;
    means for coupling the balancing element to the balancing subassembly, said coupling means including means for multiplying the rotating speed of the balancing subassembly with respect to the rotating speed of the balancing element; and
    means for withdrawing energy from the balancing subassembly.

* * * * *